(12) United States Patent
Roed et al.

(10) Patent No.: US 8,123,304 B2
(45) Date of Patent: Feb. 28, 2012

(54) HYDRAULIC SYSTEM AND METHOD FOR OPERATING A BRAKE OF A WIND TURBINE

(75) Inventors: Carsten Roed, Bjerringbro (DK); Ole Mølgaard Jeppesen, Skjern (DK); Keld Lyager Jensen, Skjern (DK); Claus Ahler, Tarm (DK)

(73) Assignee: Vestas Wind Systems A/S, Aarhus N (DK)

( * ) Notice: Subject to any disclaimer, the term of this patent is extended or adjusted under 35 U.S.C. 154(b) by 0 days.

(21) Appl. No.: 12/816,874

(22) Filed: Jun. 16, 2010

(65) Prior Publication Data

US 2011/0014048 A1 Jan. 20, 2011

Related U.S. Application Data

(60) Provisional application No. 61/187,295, filed on Jun. 16, 2009.

(30) Foreign Application Priority Data

Jun. 16, 2009 (DK) .................................. 2009 70031

(51) Int. Cl.
*B60T 13/22* (2006.01)
(52) U.S. Cl. ................................................. 303/2; 303/3
(58) Field of Classification Search .................. 303/2, 3, 303/10, DIG. 3, DIG. 4, 84.1, 84.2
See application file for complete search history.

(56) References Cited

U.S. PATENT DOCUMENTS

| 5,648,644 | A | 7/1997 | Nagel |
| 5,779,325 | A | 7/1998 | Diesel |
| 6,254,197 | B1 | 7/2001 | Lading et al. |
| 7,357,462 | B2 | 4/2008 | Uphues |
| 2008/0164751 | A1 | 7/2008 | Wedekind |
| 2008/0164752 | A1 | 7/2008 | Wedekind |

FOREIGN PATENT DOCUMENTS

| DE | 32 04 695 | 8/1983 |
| DE | 10 2004 057 522 | 4/2006 |
| GB | 688170 | 2/1953 |
| GB | 696657 | 9/1953 |
| GB | 868419 | 5/1961 |
| WO | 98/23474 | 6/1998 |
| WO | 03/080414 | 10/2003 |

OTHER PUBLICATIONS

Flemming Qvist; Examination Report issued in related Denmark Patent Application No. PA 2009 70031;Jan. 20, 2010; 6 pages; Denmark Patent and Trademark Office.

Johannes Ahrenkiel-Frellsen; First Technical Examination Report issued in Denmark Patent Application No. PA 2009 70058; Feb. 23, 2010; 5 pages; Denmark Patent and Trademark Office.

*Primary Examiner* — Christopher Schwartz
(74) *Attorney, Agent, or Firm* — Wood, Herron & Evans, L.L.P.

(57) ABSTRACT

A hydraulic system and method for controlling the brake of a wind turbine are provided. During operation of the wind turbine, pressurized working fluid in the hydraulic system is blocked from being supplied to the brake. Even if some of this fluid does reach the brake, it is drained to prevent a pressure build-up and activation. To activate the brake, this drainage is stopped and the pressurized fluid is supplied to the brake. The blocking and unblocking the pressurized working fluid may be controlled by first and second activation valves arranged in parallel in a supply line that communicates the working fluid to the brake.

16 Claims, 3 Drawing Sheets

HYDRAULIC SYSTEM AND METHOD FOR OPERATING A BRAKE OF A WIND TURBINE

CROSS-REFERENCE TO RELATED APPLICATIONS

This application claims priority under 35 U.S.C. §119(a) to DK Application No. PA 2009 70031, filed Jun. 16, 2009. This application also claims the benefit of U.S. Provisional Application No. 61/187,295, filed Jun. 16, 2009. Each of these applications is incorporated by referenced herein in its entirety.

TECHNICAL FIELD

The present invention relates to a hydraulic system for a wind turbine. More specifically, the present invention relates to a hydraulic system for operating the brake of a wind turbine and a method of controlling the brake of a wind turbine with such a hydraulic system.

BACKGROUND

A wind turbine (also referred to as a "wind turbine generator" or WTG) is typically equipped with a mechanical brake on its drive train for bringing the rotor of the wind turbine to a standstill and maintaining the wind turbine in a "parked" (i.e., stopped) position. This may be necessary during repair and maintenance operations, for example. Even though many wind turbines include pitching mechanisms that can be controlled to bring their rotors to a standstill (referred to as "idling"), a mechanical brake may still be required for safety reasons such as emergency stops.

Two types of mechanical brakes commonly used are disc brakes and clutch brakes. Disc brakes include a disc coupled to a shaft in the drivetrain and one or more hydraulically actuated calipers configured to apply friction to the disc via brake pads. The friction creates a braking torque that opposes the motion of the disc, thereby slowing the drivetrain and rotor. Clutch brakes include brake pads that are pre-tensioned by springs into a braking position, but compressed air or hydraulic fluid is typically used to act against the springs and release the brake pads.

One of the challenges in designing the hydraulic system for controlling a mechanical brake is to enable quick activation for safety reasons. For example, conventional hydraulic systems for controlling a disc brake typically include supply lines leading to the brake and one or more electrically-actuated valves located in those lines. The lines are maintained with pressurized fluid during normal operation so that the brake is quickly activated when the valves are actuated. Although such a system may provide quick activation of the brake when needed, there is also a risk that the brake may be unintentionally activated when not needed. For example, one of the valves in the supply line leading to the brake may leak. Even a small leak in one of the valves may, over time, cause a pressure buildup to activate the brake.

Additionally, valves in the supply line controlling activation of the brake are typically normally-open valves (i.e., the valves pre-tensioned into an open position). During operation the valves are electrically set into a closed position to prevent the pressurized fluid from increasing pressures at the brake. Power is switched to "off" to open the valves and activate the brake. Because the brake is only activated occasionally, the valves are highly dependent on power being "on". This arrangement has the potential to create reliability issues.

Therefore, a hydraulic system for controlling the mechanical brake that sufficiently addresses safety concerns and minimizes the risk of unintended activation is highly desirable.

SUMMARY

A hydraulic system for operating a brake in a wind turbine is disclosed. The hydraulic system is based on a braking method where the brake is prevented from being activated during operation of the wind turbine by reducing or eliminating the possibility of pressure-build ups. In particular, pressurized working fluid in the hydraulic system is blocked from being supplied to the brake, and working fluid that does leak to the brake is drained. The brake is then activated by supplying the pressurized working fluid to the brake and preventing it from being drained, thereby resulting in a pressure build-up.

In one embodiment, the brake includes a disc and at least one caliper configured to apply friction to the disc. The hydraulic system includes a pump system, a supply line fluidly connecting the pump system to the at least one caliper, a first accumulator fluidly connected to the supply line, a first activation valve located in the supply line downstream of the first accumulator, a drainage line fluidly connecting the at least one caliper to the pump system, and a first drainage valve located in the drainage line. As used herein, the terms "downstream" and "upstream" are generally used to refer to locations of components relative to each other with reference to the direction of fluid flow through the hydraulic system.

The first activation valve may be normally closed and the first drainage valve may be normally open. Consistent with the braking method mentioned above, such an arrangement prevents a pressure build-up at the calipers and unintentional activation of the brake during operation of the wind turbine. In other words, the wind turbine may be operated with less concern of the brake being activated due to leakages and other unexpected failures. When it is desired to activate the brake, it can be accomplished by opening the first activation valve, releasing pressurized working fluid stored in the first accumulator into the supply line, and closing the first drainage valve. This creates a pressure build-up at the calipers so that they move into contact with the disc.

After activation, the first activation valve may be closed and the wind turbine held in a stopped (i.e., "parked") condition with the brake. This may be accomplished, for example, by pressure from a second accumulator fluidly connected to the supply line downstream of the first activation valve. Holding the wind turbine in a stopped condition without needing the first activation valve to remain open also enables the first activation valve to be tested. In one testing method, the first activation valve is moved back into an open position while the hydraulic system holds the wind turbine in a stopped condition. The first drainage valve is opened as well, and the pressure in the supply line is monitored. The first activation valve is verified to be operating if this results in a pressure drop.

Eventually the brake may be released by closing the first activation valve (if not already closed), opening the first drainage valve, and activating the pump system to re-pressurize the first accumulator.

In yet another embodiment, a second activation valve is arranged in parallel with the first activation valve. The first and second activation valves have respective first and second power supplies, but may be activated/controlled at the same time. This has the advantage of being a "failure-safe" arrangement in that fluid can flow to the calipers even if one of the activation valves or their power supply fails. The first activation valve itself, the combination of the first and second activation valves, and other devices/arrangements that control activation of the brake, may generally be referred to as "activation means."

These and other embodiments will become more apparent based on the description below.

DETAILED DESCRIPTION

Figure 1:
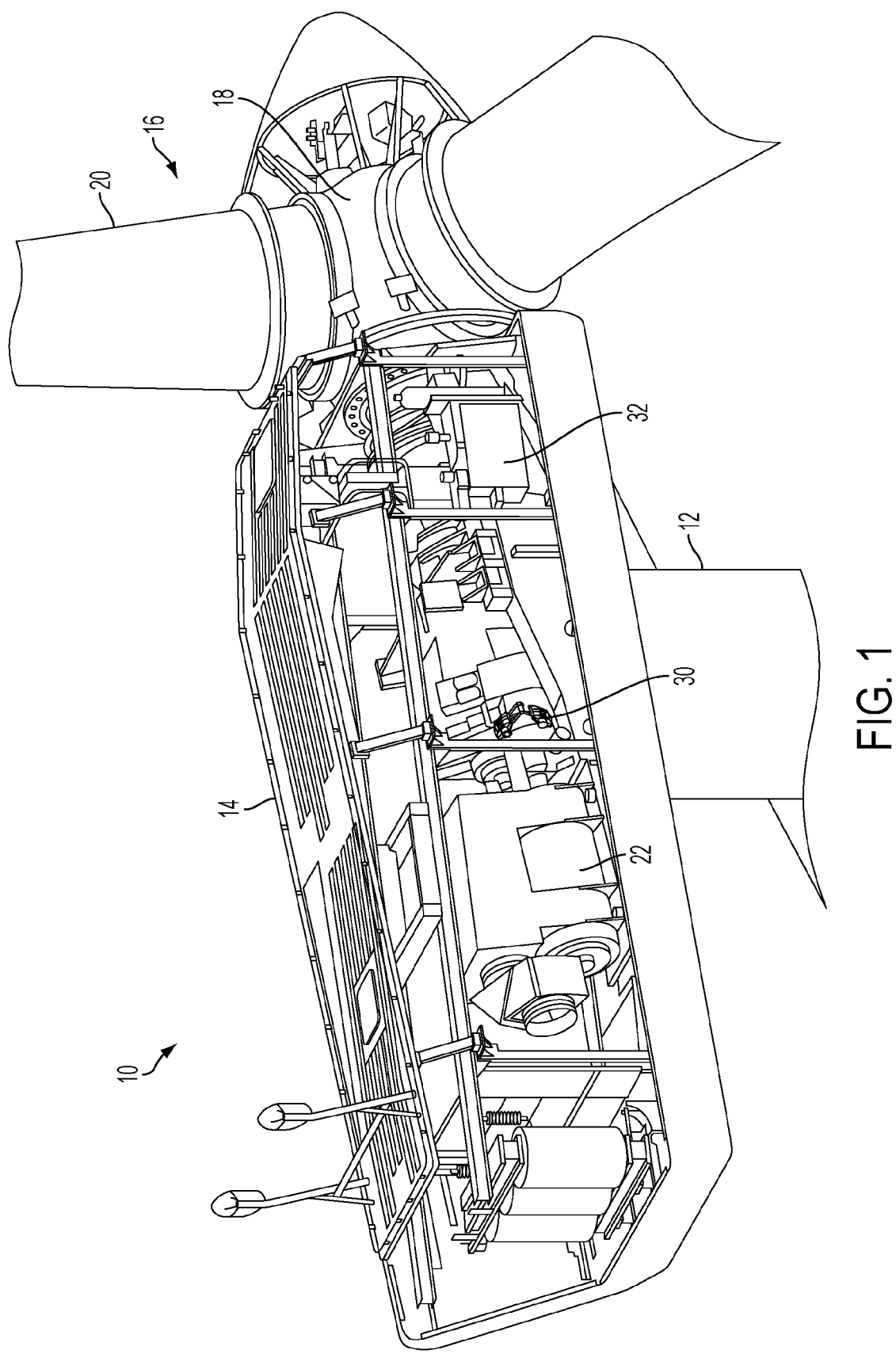
FIG. 1 is a perspective view of an example of a wind turbine, with portions cut-away so that internal components of the wind turbine can be seen.

FIG. 1 shows one embodiment of a wind turbine 10. The wind turbine generally comprises a tower 12, a nacelle 14 supported by the tower 12, and a rotor 16 attached to the nacelle 14. The rotor 16 includes a hub 18 rotatably mounted to the nacelle 14 and a set of blades 20 coupled to the hub 18. The blades 20 convert the kinetic energy of the wind into mechanical energy used to rotate the shaft of a generator 22, as is conventional.

Figure 2:
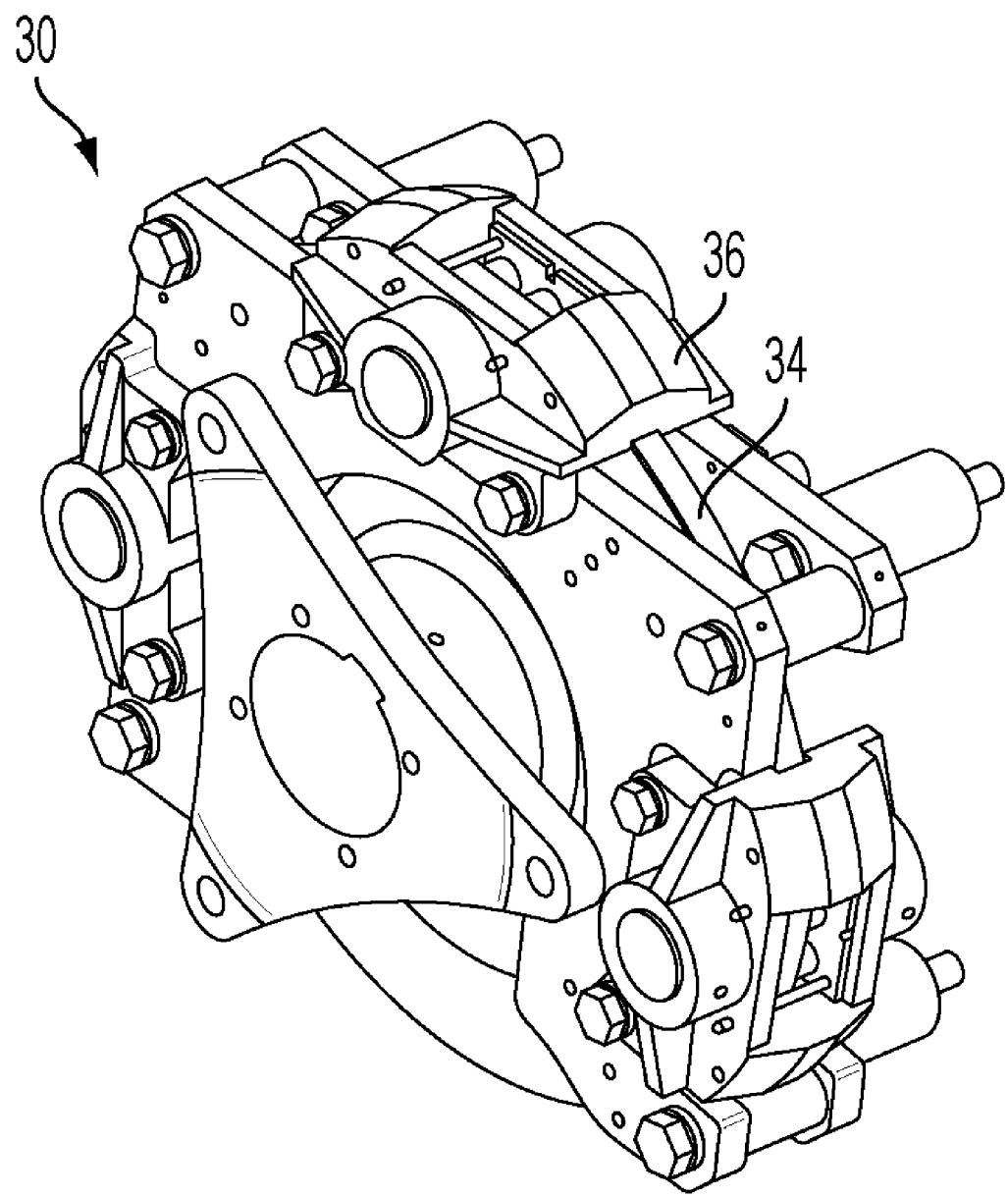
FIG. 2 is perspective view of an example of a brake for a wind turbine.

The wind turbine 10 further includes a brake 30 and a hydraulic station 32 containing the components of a hydraulic system that controls the brake 30. As shown in FIG. 2, the brake 30 typically includes a disc 34 configured to be coupled to a shaft and one or more calipers 36 configured to apply friction to the disc 34. The shaft may be a low speed shaft connected to the rotor 16, a high speed shaft connected to the generator 22, or another shaft in the drive train of the wind turbine 10 that transmits the mechanical energy generated by the rotor 16. Indeed, the disclosure below focuses on a hydraulic system and how it may be used to control the brake 30, rather than the position of the brake 30 within the wind turbine 10 or the arrangement of the disk 34 and calipers 36. Thus, it will be appreciated that FIGS. 1 and 2 are merely examples and that the hydraulic system described below may be used to control a brake having a different configuration or arrangement in relation to the other components of a wind turbine.

Figure 3:
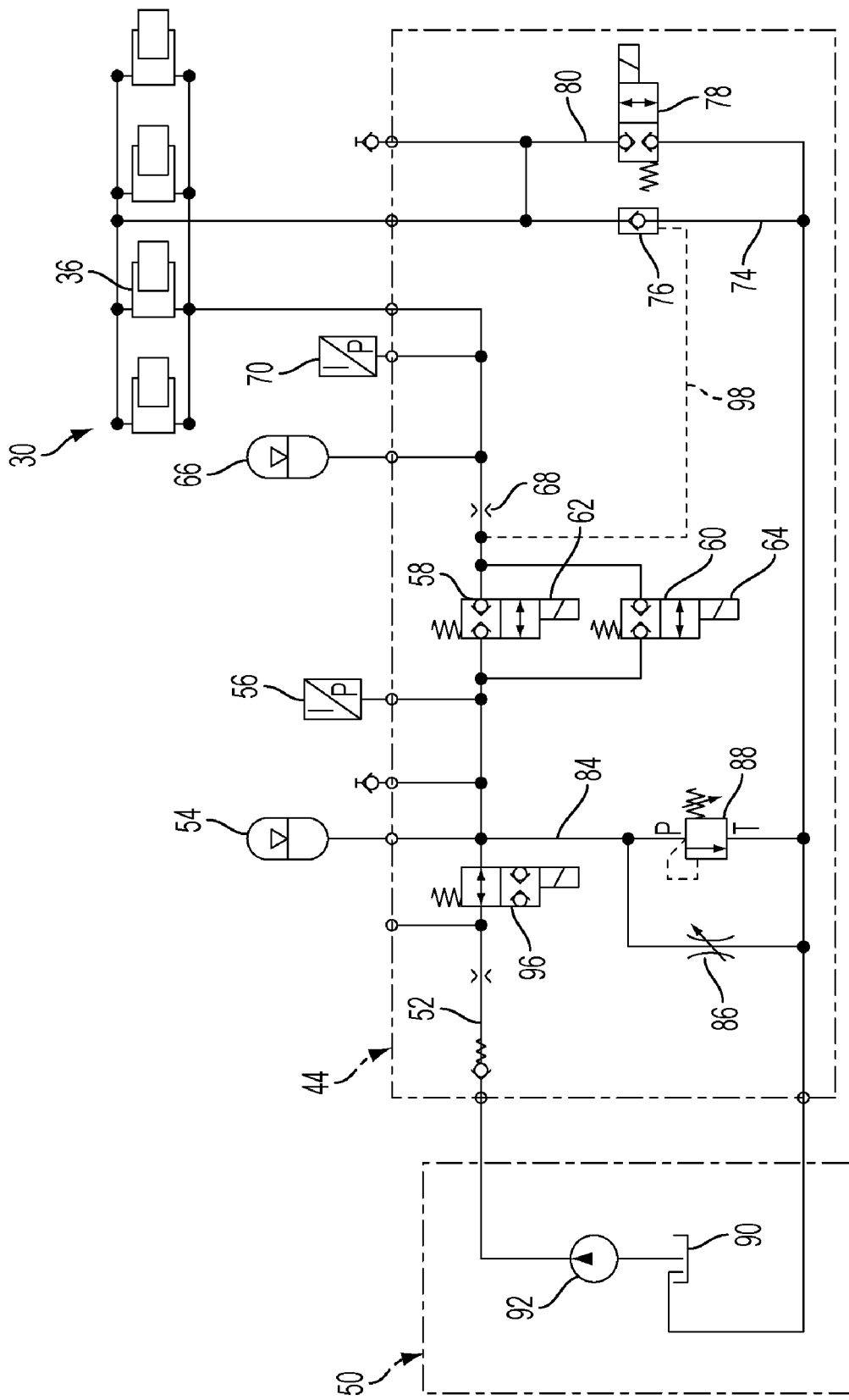
FIG. 3 is a diagram of one embodiment of a brake block a hydraulic system for controlling the brake of a wind turbine.

Now, with reference to FIG. 3, one embodiment of a hydraulic system 40 is shown. The hydraulic system 40 includes a pump system 50 (also referred to as a "hydraulic station") that moves working fluid through the hydraulic system 40, and a brake system 44 (also referred to as a "brake block") that controls the flow of the working fluid to the brake 30. The pump system 50 and brake block 44 represent different aspects of the hydraulic system 40. In fact, the brake block 44 may be used with any pump system for building and maintaining pressure of the working fluid, which is typically oil. Accordingly, only a generic pump system is illustrated.

The brake block 44 includes a supply line 52 that receives the working fluid from the pump system 50 and transports it to the calipers 36. A first accumulator 54 and first pressure switch 56 are fluidly connected to the supply line 52, and a first activation valve 58 is located in the supply line 52 downstream of these devices. The first activation valve 58 controls the flow of the working fluid to the calipers 36.

Advantageously, however, the hydraulic system 40 may further include a second activation valve 60 arranged in parallel with the first activation valve 58. By connecting the first and second activation valves 58, 60 to respective first and second uninterrupted power supplies 62, 64 and activating them at the same time, such an arrangement has the advantage of being "failure safe". That is, if either of the first and second activation valves 58, 60 or their associated power supply unexpectedly fails, flow through the supply line 52 can still be controlled by the other activation valve. Any suitable valve for controlling flow through the supply line 52 consistent with the operation of the hydraulic system 40 may be used as the first and second activation valves 58, 60. In the embodiment shown, the first and second activation valves 58, 60 are electrically-actuated, 2-way valves.

A second accumulator 66 may be fluidly connected to the supply line 52 downstream of the first and second activation valves 58, 60. Other hydraulic devices, such as a flow restrictor 68 and second pressure switch 70, may be located in this portion of the supply line 52 as well. The supply line 52 eventually splits into several branches at the brake 30 so that the working fluid can be distributed to the various calipers 36.

The hydraulic system 40 further includes a drainage line 74 that transports the working fluid from the calipers back to the pump system 50. Like the supply line 52, the drainage line 74 includes several branches at the brake 30, but these branches collect the working fluid from the various calipers 36 rather than distribute it. A first drainage valve 76 is located in the drainage line 74 to help control pressures at the brake 30, as will be described below. There may also be a second drainage valve 78 arranged in parallel with the first drainage valve 76 via a bypass line 80. To this end, the bypass line 80 is fluidly connected to the drainage line 74 both upstream and downstream of the first drainage valve 76.

The drainage line 74 may also transport working fluid from a relief line 84 back to the pump system 50. The relief line 84 is fluidly connected to the drainage line 74 downstream of the first and second drainage valves 76, 78, and to the supply line 52 upstream of the first and second activation valves 58, 60. Various hydraulic devices may be arranged within the relief line 84 to help control pressures within the hydraulic system 40. For example, FIG. 3 illustrates an adjustable flow restrictor 86 arranged in parallel with a normally-closed, pressure relief valve 88.

The pump system 50 shown in FIG. 3 is generic because, again, the brake block 44 of the hydraulic system 40 may be used with different pump system arrangements. The pump system 50 may include, for example, a tank or reservoir 90 for storing and collecting the working fluid and at least one pump 92 fluidly connected to the reservoir 90. In such an embodiment, the drainage line 74 returns the working fluid to the at least one pump 92 via the reservoir 90.

The operation of the hydraulic system 40 for controlling the brake 30 will now be described in further detail. Under normal operating conditions of the wind turbine 10 (i.e., when the rotor 16 is moving and the brake 30 is not applied), the pump system 50 has been activated to pressurize the portion of the supply line 52 upstream of the first and second activation valves 58, 60. The pressurized working fluid, however, does not reach the brake 30 because the first and second activation valves 58, 60 are normally closed. Additionally, the hydraulic devices in the relief line 84 (e.g., the flow restrictor 86 and pressure relief valve 88) prevent pressurized working fluid from freely flowing through the relief line 84, into the drainage line 74, and to the tank 90. Instead, the pressure relief valve 88 is set to a certain level and the flow restrictor 86 is controlled so that the fluid in the supply line 52 pressurizes the first accumulator 54 to the desired level.

To activate the brake 30, the pump system 50 is deactivated, the first and second activation valves 58, 60 are opened, and the first drainage valve 76 is closed. This allows the working fluid in the supply line 52 to travel past the first and second activation valves 58, 60 and to the calipers 36. As mentioned above, providing the first and second activation valves 58, 60 has the advantage of being a "failure-safe" arrangement. The working fluid can flow to the calipers 36 even if one of the first or second activation valves 58, 60 or their associated power supplies 62, 64 fails.

The pressure stored in the first accumulator 54 is released to control the flow of the working fluid to the calipers 36. However, the flow restrictor 68 downstream of the first and second activation valves 58, 60 prevents this release from causing an abrupt surge in pressure at the brake 30. Instead, the pressure at the brake 30 is increased in a more controlled manner to provide a smoother braking action (i.e., application of force) by the calipers 36 to the disc 34. This also helps reduce the loads on the wind turbine 10 created by the braking action.

If desired, the hydraulic system may further include an isolation valve 96 located in the supply line 52 between the pump system 50 and the first accumulator 54. The isolation valve 96 may be open during normal operation of the wind turbine 10, but switched to a closed position when activating the brake 30. This helps isolate the portion of the supply line 52 downstream of the isolation valve 96 so that the flow of the working fluid is only influenced by the release of pressure from the first accumulator 54. In other words, the first accumulator 54 controls the flow of the working fluid to the brake 30 with minimal or no interference from the pump system 50. The first pressure switch 56 can then be used to more accurately estimate the pressure in the first accumulator 54, as will be described below.

The pressure of the working fluid increases at the brake 30—resulting in the application of the calipers 36 to the disc 34—because the first and second drainage valves 76, 78 are closed. In the embodiment shown in FIG. 4, the first drainage valve 76 is a check valve fluidly connected to the supply line 52 by a detection line 98. The detection line 98 is fluidly connected to the supply line 52 downstream of the first and second activation valves 58, 60. Any significant build-up of pressure in this portion of the supply line 52 is communicated to the first drainage valve 76 and causes it to close. Thus, the first drainage valve 76 closes when the first and second activation valves 58, 60 open and allow the pressure stored in the first accumulator 54 to be released into the supply line 52.

The flow of working fluid past the first and second activation valves 58, 60 not only increases pressure at the brake 30, but also pressurizes the second accumulator 66. Eventually the working fluid at the calipers 36 reaches a pressure that corresponds to a maximum desired braking force applied to the disc 34. At this point, the first and second activation valves 58, 60 may be closed. For example, the first and second activation valves 58, 60 may be set to automatically close after a certain time period. The build up of pressure at the calipers 36 and in the second accumulator 66 may then be used to hold the brake 30 (i.e., keep the calipers 36 applied to the disc 34 with a sufficient braking force) after the drivetrain and rotor 16 are brought to a stop.

To release the brake 30, the pump system 50 is activated (e.g., the pump 92 is turned back on) and the isolation valve 96 is opened. The pump system 50 supplies working fluid to the supply line 52 and first accumulator 54, which is then re-pressurized. Additionally, the working fluid downstream of the first and second activation valves 58, 60 (which remain closed after holding the brake 30) is flushed from the calipers 36. To this end, the first and second drainage valves 76, 78 are moved into open positions. The second drainage valve 78 may have a greater flow capacity than the first drainage valve 76 to drain the working fluid faster from the calipers 36, second accumulator 66, and portion of the supply line 52 downstream of the first and second activation valves 58, 60. Depending on the capacity of the first drainage valve 76, the second drainage valve 78 may only need to be opened for a few seconds to help drain the working fluid. When the second drainage valve 78 is moved back to its normal, closed position, the hydraulic system 40 is ready to activate the brake 30 again according to the procedures described above.

Therefore, both during normal operation of the wind turbine 10 and during stopped conditions (caused by activation of the brake 30), the first and second activation valves 58, 60 are in their normal, closed positions; no voltage is activating the first and second activation valves 58, 60. Accordingly, unlike conventional systems, the hydraulic system 40 does not rely upon power supplies (e.g., the first and second power supplies 62, 64) to prevent activation of the brake 30 during operation, or to maintain sufficient pressure on the brake 30 after it has been used to stop the rotor 16 from rotating. Because these time periods are significantly longer than the time required to activate the brake 30, the overall reliability of the hydraulic system 40 is increased. Although the first and second power supplies 62, 64 are still relied upon for activation of the brake 30, the failure-safe arrangement described above adds further reliability to the system.

The above-described arrangement also has the advantage of preventing damage to the brake 30 during operation even if there is a leakage or failure in one or both of the first and second activation valves 58, 60. In particular, if there is a small leakage of working fluid through the first or second activation valve 58, 60 when they are closed such that some working fluid flows to the calipers 36, the drainage line 74 and open position of the first drainage valve 76 allows the working fluid to drain from the brake 30. There is no build-up of pressure that may otherwise cause the calipers 36 to contact the disc 34 and heat up as a result of friction. On the other hand, if one or both of the first and second activation valves 58, 60 has failed completely, the increase in pressure is communicated to the first drainage valve 76 via the detection line 98. The first drainage valve 76 then closes when the pressure increase reaches a certain level so that the pressure of the working fluid at the calipers 36 then increases according to a normal activation of the brake 30.

Other advantageous features will be readily apparent to those skilled in the art. For example, the second pressure switch 70 may also be used to provide feedback about pressures in the portion of the supply line 52 downstream of the first and second activation valves 58, 60. That way, even if there is not a complete failure in the first or second activation valves 58, 60, the hydraulic system 40 can send a signal to open the valves when the pressure is high enough to close the first drainage valve 76. This further ensures that that brake 30 is applied according to normal activation profiles. Moreover, it also allows activation of the brake 30 when the leakage is large enough to warrant concerns, even if the first activation valve 58 or second activation valve 60 has not completely failed.

Another advantage of the hydraulic system 40 is the ability to test several of the components during stopped conditions (i.e., when the brake 30 is being held after activation or when the rotor 16 is idling such that increases of pressure at the calipers 36 and application of the brake 30 does not matter). In such conditions, the first and second activation valves 58, 60 and the first and second drainage valves 76, 78 are closed. The first activation valve 58 is then opened while keeping the second activation valve 60 closed. If the second pressure switch 70 indicates an increase in pressure when the first drainage valve 76 is opened, the opening of the first activation valve 58 has been verified. The first activation valve 58 and the first drainage valve 76 may then be closed.

The same procedure may be repeated for testing the second activation valve 60. In particular, the second activation valve 60 is opened while keeping the first activation valve 58 closed, and then the first drainage valve 76 is opened and the pressure is monitored with the first pressure switch 56. If the first pressure switch 56 indicates a pressure drop in the supply line 52 when the first drainage valve 76 is opened, the opening of the second activation valve 60 has been verified.

The ability to test the first and second activation valves 58, 60 during a stopped condition enables power failures or other defects that prevent the valves from opening to be easily identified. As a result, the defects can be repaired (e.g., by replacing the first or second activation valve 58, 60 and/or the first and second power supplies 62, 64) before it affects the operation of the hydraulic system 40. If, during the testing procedures, both the first and second activation valves 58, 60 fail verification, it might be a result of the first drainage valve 76 not operating properly rather than the first and second activation valves 58, 60 failing to open. Thus, the procedure described above also serves to test the operation of the first drainage valve 76 as well.

Finally, the first accumulator 54 may also be tested, but this test occurs after releasing the brake 30. More specifically, after opening the first and second drainage valves 76, 78 to flush working fluid from the calipers 36 (and the second accumulator 66 and portion of the supply line 52 downstream of the first and second activation valves 58, 60), the first and/or second activation valves 58, 60 may be opened. This occurs prior to activating the pump system 50 and opening the isolation valve 96 (see discussion above about releasing the brake), and allows any remaining pressure in the first accumulator 54 to be released. The first pressure switch 56 monitors the decrease in pressure in the supply line 52 until it reaches zero or some minimum valve as the working fluid is drained. The amount of time it takes for the pressure to decrease from a predetermined level (which may be the same or less than the pressure before opening the first and/or second activation valves 58, 60) to zero (or another predetermined level), is compared to a predicted value for a normally-operating accumulator. If the time is within an acceptable deviation from the predicted value, the first accumulator 54 is operating sufficiently.

The embodiments described above are merely examples of the invention defined by the claims that appear below. Those skilled in the design of hydraulic braking systems will appreciate additional examples, modifications, and advantages based on the description. For example, rather than communicating pressures in the supply 52 to the first drainage valve 76 via the detection line 98, the first drainage valve 76 may be electrically-actuated and controlled using feedback from the second pressure switch 70. Accordingly, departures may be made from the details of this disclosure without departing from the scope or spirit of the general inventive concept.

What is claimed is:

1. A hydraulic system for operating a brake in a wind turbine, the brake including a disc and at least one caliper configured to apply friction to the disc, the hydraulic system comprising:
a pump system;
a supply line fluidly connecting the pump system to the at least one caliper;
a first accumulator fluidly connected to the supply line;
a first activation valve located in the supply line downstream of the first accumulator;
a drainage line fluidly connecting the at least one caliper to the pump system;
a first drainage valve located in the drainage line; and
a detection line configured to communicate pressures from the supply line to the first drainage valve, the detection line being connected to the supply line downstream of the first activation valve.

2. The hydraulic system according to claim 1, wherein the first activation valve is normally closed and the first drainage valve is normally open.

3. The hydraulic system according to claim 1, wherein the pump system further comprises:
a reservoir for storing working fluid; and
at least one pump fluidly connected to the reservoir, the drainage line being fluidly connected to the at least one pump via the reservoir.

4. The hydraulic system according to claim 1, further comprising:
a flow restrictor located in the supply line downstream of the first accumulator.

5. The hydraulic system according to claim 1, further comprising:
a second accumulator fluidly connected to the supply line downstream of the first activation valve.

6. The hydraulic system according to claim 1, further comprising:
at least one pressure switch located in the supply line between the first accumulator and the at least one caliper.

7. The hydraulic system according to claim 1, further comprising:
an isolation valve located in the supply line between the pump system and the first accumulator.

8. The hydraulic system according to claim 1, further comprising:
a second activation valve arranged in parallel with the first activation valve;
a first power supply associated with the first activation valve; and
a second power supply associated with the second activation valve.

9. A method of controlling a brake of a wind turbine with a hydraulic system, comprising:
providing a pump system, a supply line fluidly connecting the pump system to the at least one caliper, a first accumulator fluidly connected to the supply line, a first activation valve located in the supply line downstream of the first accumulator, a drainage line fluidly connecting the at least one caliper to the pump system, and a first drainage valve located in the drainage line;
operating the wind turbine without the brake being activated, the first activation valve of the hydraulic system being closed and the first drainage valve being open to prevent a pressure build-up at the at least one caliper; and
activating the brake by:
opening the first activation valve;
releasing pressurized working fluid stored in the first accumulator into the supply line;
closing the first drainage valve to create a pressure build-up at the at least one caliper;
closing the first activation valve after the brake has been activated;
opening the first drainage valve; and
activating the pump system to re-pressurize the first accumulator.

10. The method according to claim 9, further comprising:
closing the first activation valve after the brake has been activated; and holding the wind turbine in a stopped condition with the brake after closing the first activation valve.

11. The method according to claim 10, further comprising:
opening the first activation valve while holding the wind turbine in a stopped condition;
opening the first drainage valve; and
monitoring pressure in the supply line to determine if opening the first drainage valve results in a pressure drop, thereby indicating that the first activation valve has been opened.

12. A method of controlling a brake of a wind turbine, comprising:
preventing activation of the brake during operation of the wind turbine by:
blocking pressurized working fluid in the hydraulic system from being supplied to the brake; and
draining any working fluid that leaks to the brake to prevent a pressure build-up and activation; and
activating the brake by:
supplying the pressurized working fluid to the brake;
preventing the pressurized working fluid from being drained from the brake, thereby resulting in a pressure build-up; and
arranging first and second activation valve in parallel in a supply line configured to communicate the working fluid to the brake, the first and second activation valves being normally closed and having respective first and second power supplies.

13. The method according to claim 12, wherein the brake is activated until the wind turbine stops operating, the method further comprising:
closing the first and second activation valves; and
holding the wind turbine in a stopped condition with an accumulator located in the supply line downstream of the first and second activation valves.

14. The method according to claim 13, further comprising:
testing the function of the first and second activation valves when holding the wind turbine in a stopped condition by:
a) opening the first activation valve;
b) opening a drainage valve in a drainage line that drains working fluid from the brake; and
c) monitoring pressure in the supply line to determine if opening the drainage valve resulted in a pressure increase downstream of the first and second activation valves, thereby indicating that the first activation valve has been opened;
d) closing the drainage valve; and
e) repeating steps a-d for the second activation valve.

15. A hydraulic system for operating a brake in a wind turbine, the brake including a disc and at least one caliper configured to apply friction to the disc, the hydraulic system comprising:
a pump system;
a supply line fluidly connecting the pump system to the at least one caliper;
a first accumulator fluidly connected to the supply line;
a first activation valve located in the supply line downstream of the first accumulator;
a drainage line fluidly connecting the at least one caliper to the pump system;
a first drainage valve located in the drainage line;
a bypass line fluidly connected to the drainage line between the at least one caliper and the first drainage valve, the bypass line also being fluidly connected to the drainage line downstream of the first drainage valve; and
a second drainage valve located in the bypass line, the second drainage valve having a greater flow capacity than the first drainage valve.

16. A wind turbine, comprising:
a tower;
a nacelle supported by the tower;
a rotor rotatably coupled to the nacelle;
a shaft located in the nacelle and drivingly coupled to the rotor;
a brake including a disc coupled to the shaft and at least one caliper configured to apply friction to the disc; and
a hydraulic system for operating the brake, the hydraulic system comprising:
a pump system;
a supply line fluidly connecting the pump system to the at least one caliper;
a first accumulator fluidly connected to the supply line;
a first activation valve located in the supply line downstream of the first accumulator;
a drainage line fluidly connecting the at least one caliper to the pump system;
a first drainage valve located in the drainage line; and
a detection line configured to communicate pressures from the supply line to the first drainage valve, the detection line being connected to the supply line downstream of the first activation valve.

* * * * *

UNITED STATES PATENT AND TRADEMARK OFFICE
CERTIFICATE OF CORRECTION

PATENT NO. : 8,123,304 B2  
APPLICATION NO. : 12/816874  
DATED : February 28, 2012  
INVENTOR(S) : Carsten Roed et al.

Page 1 of 1

It is certified that error appears in the above-identified patent and that said Letters Patent is hereby corrected as shown below:

Column 1

Line 61, after "valves" insert --are--.

Column 3

Line 12, after "is" insert --a--.

Line 14, after "block" insert --of--.

Column 7

Line 16, change "it affects" to --they affect--.

Column 9

Claim 12, line 24, change "valve" to --valves--.

Signed and Sealed this
Fourteenth Day of August, 2012

David J. Kappos
*Director of the United States Patent and Trademark Office*